United States Patent [19]

Gunderson

[11] 4,193,608
[45] Mar. 18, 1980

[54] COMBINATION WAGON AND SLED
[76] Inventor: Arthur S. Gunderson, P.O. Box 215, Minooka, Ill. 60447
[21] Appl. No.: 942,575
[22] Filed: Sep. 15, 1978
[51] Int. Cl.² .............................................. B62B 13/18
[52] U.S. Cl. .......................................... 280/8; 280/16; 280/24
[58] Field of Search .................. 280/21 R, 24, 15, 16, 280/18, 7.12, 7.13, 433, 400, 43.12; 46/201, 202

[56] References Cited
U.S. PATENT DOCUMENTS

| | | | |
|---|---|---|---|
| 791,820 | 6/1905 | Sattler | 280/16 |
| 1,851,094 | 3/1932 | Goodwin | 280/8 |
| 2,595,839 | 5/1952 | Gellenbeck | 280/8 X |
| 2,679,401 | 5/1954 | Williams | 280/11.23 |
| 2,679,712 | 6/1954 | Schwien et al. | 46/201 X |
| 3,827,719 | 8/1974 | Lohr et al. | 280/400 X |

FOREIGN PATENT DOCUMENTS 839173  4/1952  Fed. Rep. of Germany .......... 280/7.13

Primary Examiner—Joseph F. Peters, Jr.
Assistant Examiner—D. W. Underwood
Attorney, Agent, or Firm—Ernest Kettleson

[57] ABSTRACT

A combination sled and wagon comprising a vehicle having first and second sides, runners disposed on the first and second sides, the sides having open ended slots therein, wheels mounted on axles adapted to be disposed in the slots and adapted to be removed therefrom, the wheels being operative to support the vehicle when the axles are disposed in the slots, and the runners being operative to support the vehicle when the axles are removed from the slots.

10 Claims, 5 Drawing Figures

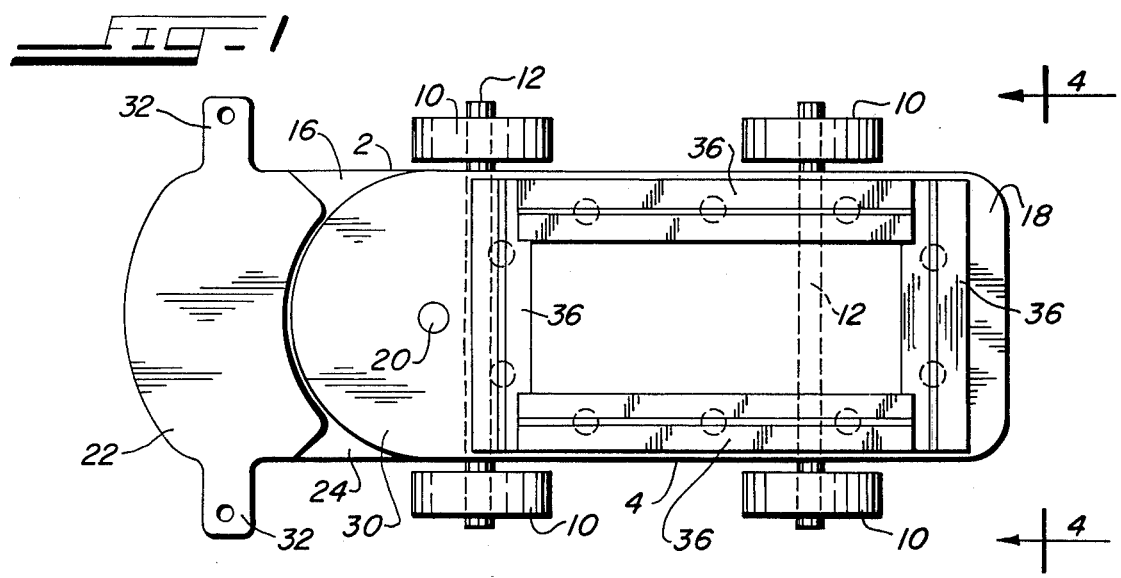
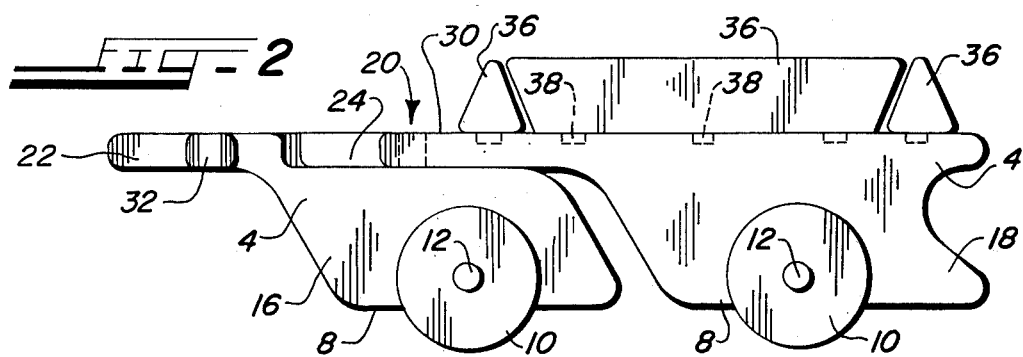
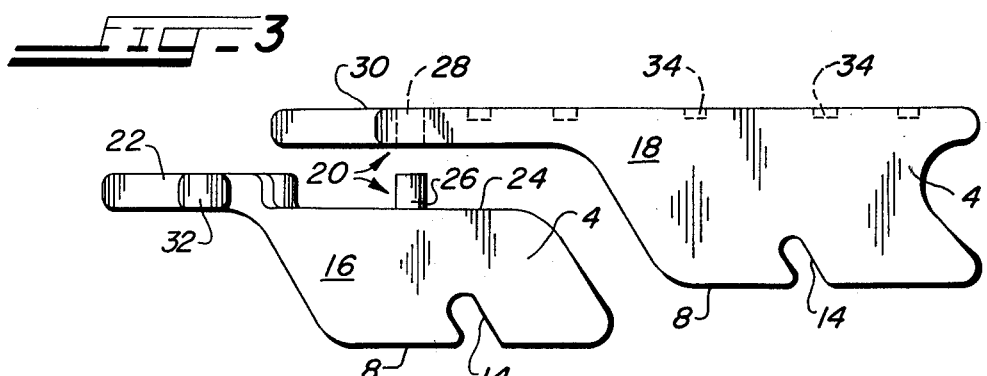
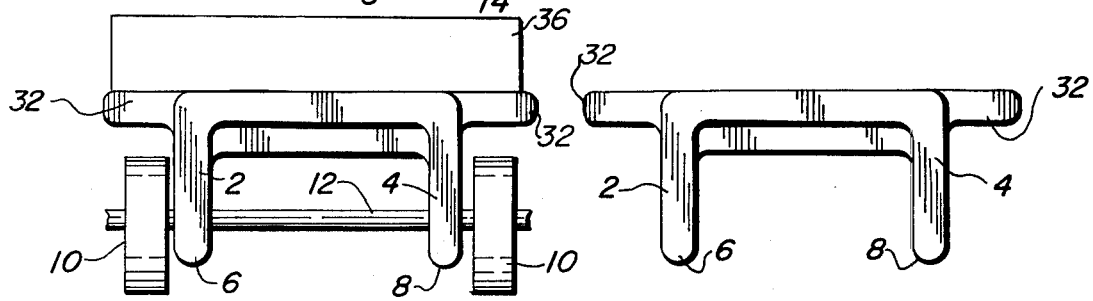

COMBINATION WAGON AND SLED

BACKGROUND OF THE INVENTION

1. Field of the Invention

This invention relates to wagons and sleds and is directed more particularly to a combination wagon and sled which may be easily converted from one to the other.

2. Description of the Prior Art

The adaptation of wagons for movement on snow and ice is generally known. Examples of such adaptations may be found in U.S. Pat. Nos. 2,414,244 issued Jan. 14, 1947 to D. D. Roth; 2,418,038 issued Mar. 25, 1947 to E. W. Lersch; 2,429,737 issued Oct. 28, 1947 to R. L. Willenberg; 2,523,950 issued Sept. 26, 1950 to G. J. Golubich; 2,530,240 issued Nov. 14, 1950 to J. H. Graham; and 2,937,878 issued May 24, 1960 to J. A. Reina.

The developments disclosed in the above patents generally depend upon the mounting of runner means on the wheels of the wagon.

SUMMARY OF THE INVENTION

An object of the present invention is to provide a combination sled and wagon in which the wheel means may be removed to facilitate use of the vehicle as a sled.

A further object of the invention is to provide a combination sled and wagon in which the vehicle, when in use as a wagon or sled, is provided with the guidance facility of a sled.

A still further object of the invention is to provide a combination sled and wagon in which the change from wagon to sled, and vice versa, may be quickly and easily accomplished.

A still further object of the invention is to provide such a vehicle as is inexpensive to manufacture and easy and entertaining to use.

With the above and other objects in view, as will hereinafter appear, a feature of the present invention is the provision of a combination sled and wagon comprising a vehicle having first and second side means, runner means disposed on the first and second side means, the side means having open ended slots therein, and wheel means having axle means adapted to be disposed in the slots and adapted to be removed therefrom, the wheel means being operative to support the vehicle when the axle means are disposed in the slots, the runner means being operative to support the vehicle when the axle means are removed from the slots.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

FIG. 1 is a plan view of one form of combination sled and wagon illustrative of an embodiment of the invention;

FIG. 2 is a side elevational view of the assembly shown in FIG. 1;

FIG. 3 is an exploded view of the assembly, less the wheel means;

FIG. 4 is a back elevational view of the assembly when in use as a wagon; and

FIG. 5 is a back elevational view of the assembly when in use as a sled.

DESCRIPTION OF THE PREFERRED EMBODIMENT

Referring to the drawings, it will be seen that the illustrative assembly comprises a vehicle having first and second sides 2, 4 having runner means 6, 8 thereon. As shown particularly in FIGS. 4 and 5, the runner means 6, 8 merely comprise rounded edges of the first and second sides 2, 4. Wheels 10 mounted on axles 12 are provided, the axles 12 being adapted to be disposed in and removed from open ended slots 14 (FIG. 3) disposed in the first and second sides 2, 4. As may be seen particularly in FIGS. 4 and 5, the wheels 10 are operative to support the vehicle when the axles 12 are disposed in the slots 14 (FIG. 4), and the runner means 6, 8 are operative to support the vehicle when the axles 12 are removed from the slots 14 (FIG. 5).

Preferably, the vehicle assembly includes a first vehicle portion 16 having a first set of the slots 14 therein, and a second vehicle portion 18 having a second set of the slots 14 therein. The first and second vehicle portions 16, 18 are provided with pivotal connection means 20 for interconnecting the first and second vehicle portions.

The first vehicle portion 16 includes a first deck portion 22 and a second deck portion 24, the second deck portion 24 being recessed relative to the first deck portion 22. A first portion 26 of the pivotal connection means 20 is disposed on the second deck portion 24 and is adapted to engage a second pivotal connection portion 28 disposed on a tongue portion 30 of the second vehicle portion 18, the tongue portion 30 being adapted to overlie the second deck portion 24 when the first and second vehicle portions 16, 18 are connected together, as shown in FIG. 2. Preferably, the first pivotal connection portion 26 comprises a pin upstanding from the second deck portion 24 and the second pivotal connection portion 28 comprises a complementary shaped bore disposed in the tongue portion 30.

The first deck portion 22 of the first vehicle portion 16 is provided with first and second handles 32 extending from either side of the first deck portion 22.

The second vehicle portion 18 is provided on an upper surface thereof with a series of recesses 34. Wall means 36 are provided having fingers 38 extending therefrom, the fingers 38 being shaped complementarily to the recesses 34, the recesses 34 being adapted to receive and releasably retain the fingers 38. Thus, when it is desired that the vehicle be used as a wagon, the wall means 36 may be positioned on the second vehicle portion 18 by insertion of the fingers 38 in the complementary recesses 34. Upon conversion of the vehicle to a sled, the wall means 36 may be readily removed from the vehicle.

In use, the vehicle has the facility of a wagon when the axles 12 are disposed within the slots 14, the vehicle thereby being supported by the wheels 10. For the purpose of carrying cargo, the vehicle is provided with the wall means 36. If it is desired to use the vehicle for entertainment as a wagon, it may be desirable to remove the wall means 36 and operate the wagon as one would ordinarily operate a sled, i.e., by use of the handles 32 to guide the wagon down an incline, its occupant or occupants being seated, or lying upon the upper surfaces of the two vehicle portions. To convert the vehicle to use as a sled, it is necessary only that the axles 12 be removed from the slots 14, in which instance the vehicle is supported by its runner means 6, 8 for movement upon snow or ice.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. Combination sled and wagon comprising a cargo transportable vehicle having first and second side means, cargo carrying deck means for supporting a cargo thereon between said first and second side means, runner means disposed on said first and second side means, said side means having open ended slots therein, and wheel means having axle means adapted to be disposed in said slots and adapted to be removed therefrom, including an axle shaft, said slots having a narrow width corresponding to the diameter of said axle shaft, said wheel means being operative to support said vehicle when said axle means are disposed in said slots, said runner means being operative to support said vehicle when said axle means are removed from said slots, said open ended slots being inclined in the direction of forward movement of said vehicle to minimize drag and to facilitate forward movement thereof on a surface when said runner means are in sliding contact with said surface, said cargo carrying deck means being wide enough to support a person lying thereon.

2. The invention according to claim 1 in which said vehicle comprises a first vehicle portion having a first set of said slots therein, a second vehicle portion having a second set of said slots therein, and pivotal connection means for interconnecting said first and second vehicle portions.

3. The invention according to claim 2 in which said first vehicle portion comprises a two wheel single axle chassis connected forwardly of and to said second vehicle portion, including a first deck portion and a second deck portion, said second deck portion being recessed relative to said first deck portion, said first set of slots of said first vehicle portion comprising a first slot at an intermediate location along a first side thereof, a second slot at a corresponding intermediate location along the second opposite side thereof, said first and second slots providing seating means for an axle for said two wheel single axle chassis, said pivotal connection means lying forward of said axle seating means in the direction of forward movement of said vehicle and in close proximity thereto.

4. The invention according to claim 3 in which a first portion of said pivotal connection means is disposed on said second deck portion and is adapted to engage a second portion of said pivotal connection means disposed on a tongue portion of said second vehicle portion, said tongue portion being adapted to overlie said second deck portion when said first and second vehicle portions are connected together throughout a first mutual abutment area forward of said intermediate location of said axle seating means of said single axle chassis of said first vehicle portion and throughout a second mutual abutment area rearward of said intermediate location of said axle seating means, whereby the weight of said tongue portion resting on said second deck portion maintains said first vehicle portion in substantially fixed horizontal alignment with said second vehicle portion.

5. The invention according to claim 4 in which an upper surface of said first deck portion is substantially co-planar with an upper surface of said second vehicle portion.

6. The invention according to claim 5 including first and second handles extending from either side of said first deck portion.

7. The invention according to claim 5 including recesses disposed in said upper surface of said second vehicle portion, said recesses being adapted to receive and releasably retain wall means adapted to define a compartment in said second vehicle portion.

8. The invention according to claim 5 in which said pivotal connection means comprises a pin upstanding from said second deck portion and a complementary shaped bore in said tongue portion for receiving said pin.

9. The invention according to claim 2, wherein said first vehicle portion includes a first pair of first and second side members, first runner means along the bottom edge of said first and second side members of said first pair, each of said first and second side members of said first pair including a first front edge facing toward the direction of forward movement of said vehicle, said first front edge including a forwardly inclined portion joined to the front end of said first runner means which is inclined in the direction of forward movement of said vehicle to facilitate forward movement thereof on a surface when said first runner means are in sliding contact with said surface, said second vehicle portion includes a second pair of first and second side members, second runner means along the bottom edge of said first and second side members of said second pair, each of said first and second side members of said second pair including a second front edge facing toward the direction of forward movement of said vehicle and toward said first and second side members respectively of said first pair, said first and second side members of said second pair being located behind respective ones of said first and second side members of said first pair, said second front edge including a forwardly inclined portion joined to the front end of said second runner means which is inclined in the direction of forward movement of said vehicle to facilitate forward movement thereof on a surface when said second runner means are in sliding contact with said surface.

10. The invention according to claim 4, wherein said second vehicle portion also comprises a two wheel, single axle chassis, said second set of slots of said second vehicle portion comprising a third slot at an intermediate location along a first side thereof, a fourth slot at a corresponding intermediate location along the second opposite side thereof, said third and fourth slots providing seating means for an axle for said two wheel single axle chassis of said second vehicle portion, the weight of said tongue portion of said second vehicle portion resting on said second deck portion of said first vehicle portion maintaining both of said respective two wheel, single axle chassis of said first and second vehicle portions in substantially fixed horizontal alignment.

* * * * *